United States Patent
Wang et al.

(10) Patent No.: US 10,462,792 B2
(45) Date of Patent: Oct. 29, 2019

(54) DETERMINING A LOCATION OF A UE WITHIN A COVERAGE AREA

(71) Applicant: APPLE INC., Cupertino, CA (US)

(72) Inventors: Xiaowen Wang, Cupertino, CA (US); William Burchill, San Jose, CA (US); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 42 days.

(21) Appl. No.: 15/165,424

(22) Filed: May 26, 2016

(65) Prior Publication Data

US 2016/0353429 A1    Dec. 1, 2016

Related U.S. Application Data (60) Provisional application No. 62/168,447, filed on May 29, 2015.

(51) Int. Cl.
    *H04W 72/04*      (2009.01)
    *H04B 7/0413*      (2017.01)
    *H04W 4/02*      (2018.01)

(52) U.S. Cl.
    CPC ........ *H04W 72/048* (2013.01); *H04B 7/0413* (2013.01); *H04W 4/02* (2013.01); *H04W 72/04* (2013.01); *H04W 72/0453* (2013.01)

(58) Field of Classification Search
    CPC ..... H04W 72/048; H04W 72/04; H04W 4/02; H04W 72/0453; H04B 7/0413
    See application file for complete search history.

(56) References Cited

U.S. PATENT DOCUMENTS

| | | | |
|---|---|---|---|
| 2008/0039089 A1* | 2/2008 | Berkman | H04W 36/04 455/436 |
| 2015/0334543 A1* | 11/2015 | Yin | H04L 29/12 455/414.1 |

FOREIGN PATENT DOCUMENTS

| | | |
|---|---|---|
| EP | 0 544 095 | 6/1993 |
| WO | 01/50807 | 7/2001 |
| WO | 2011/018892 | 2/2011 |

* cited by examiner

*Primary Examiner* — Omar J Ghowrwal
(74) *Attorney, Agent, or Firm* — Fay Kaplun & Marcin, LLP (57) ABSTRACT

A method and a device for performing massive multiple-input and multiple-output ("MIMO") operations with a user equipment (UE). The method and device receive signals from a UE within a coverage area of the device, determine a location of the UE within the coverage area and assign an operating frequency band to the UE for communication with the device, wherein the coverage area includes a plurality of regions and the operating frequency band assigned to the UE is based on the one of the regions corresponding to the location and transmit the operating frequency band assignment to the UE.

18 Claims, 5 Drawing Sheets

DETERMINING A LOCATION OF A UE WITHIN A COVERAGE AREA

PRIORITY CLAIM/INCORPORATION BY REFERENCE

This application claims priority to U.S. Provisional Application 62/168,447 entitled "Apparatus, Systems and Methods For Interference Management in Massive Multiple-Input and Multiple-Output (MIMO) Operations," filed on May 29, 2015, the entirety of which is incorporated herein by reference.

BACKGROUND

In wireless communication networks, multiple-input and multiple-output ("MIMO") operations are methods for multiplying the capacity of a radio link through the use of multiple transmit and receive antennas. MIMO technology has been incorporated into wireless broadband standards such as the third generation partnership project ("3GPP") standards (e.g., 4G-Long Term Evolution ("LTE") networks) and the Institute of Electrical and Electronics Engineers ("IEEE") wireless technologies. By exploiting multipath propagation, MIMO communications utilizes more antennas per transmitter/receiver to allow for both a greater number of possible signal paths and improved performance in terms of data rate and link reliability. However, the downside of MIMO-based communications includes increased complexity of the hardware and the complexity as well as the energy consumption of the signal processing at both ends of a transmission.

Massive MIMO, or large-scale MIMO, refers to techniques using a very large number (e.g., hundreds or thousands) of transmit and receive antennas. Accordingly, massive MIMO makes improvements over current practice through the use of these numerous antennas that are operated coherently and adaptively. Extra antennas help by focusing the transmission and reception of signal energy into ever-smaller regions of space. This can bring significant improvements in throughput and reductions in required transmit power, particularly when combined with simultaneous scheduling of a large number of user terminals (e.g., tens or hundreds). Massive MIMO networks can also significantly increase the signal strength at a mobile device, or user equipment ("UE"), even if only the serving node, or enhanced Node B ("eNB"), has the large number of antennas. However, it is important to note that conventional usage of massive MIMO communications is based on single frequency networks. Furthermore, while massive MIMO reduces required transmit power, conventional MIMO (i.e., not massive MIMO) requires more energy consumed at the UE due to multiple radio frequency ("RF") chains and complex signal processing.

While benefits of massive MIMO include the extensive use of inexpensive low-power components, reduced latency and simplification of the media access control ("MAC") layer, there are limitations to the current operations. For instance, in conventional methods for managing interference between different cells in a network, the eNB coordinates the transmissions of UEs at the cell edge. These coordinated transmissions direct the UEs to use a specific part of the frequency spectrum band. However, these communications can necessitate a great deal of overhead and power consumption in order to distribute the management information throughout the network. Accordingly, a more efficient system and method are needed for interference management in massive MIMO communication systems.

SUMMARY

Described herein are systems and methods for interference management in a massive MIMO communication system. A method may comprise determining, by a base station, a user equipment ("UE") location of a first UE, wherein the base station communicates with the first UE via massive multiple-input and multiple-output ("MIMO") operations, assigning a frequency band to be used by the first UE based on the UE location, identifying a new UE location of the first UE, and adjusting the frequency band to be used by the first UE based on the new UE location.

Further described herein is a base station device having a plurality of antennas configured to perform massive multiple-input and multiple-output ("MIMO") operations, receive circuitry configured to receive signals from a user equipment (UE) within a coverage area of the base station, a baseband processor configured to determine a location of the UE within the coverage area and assign an operating frequency band to the UE for communication with the base station, wherein the coverage area includes a plurality of regions and the operating frequency band assigned to the UE is based on the one of the regions corresponding to the location and transmit circuitry to transmit the operating frequency band assignment to the UE.

Further described herein is a method performed by a base station. The method includes communicating with a first user equipment ("UE") and a second UE via massive multiple-input and multiple-output ("MIMO") operations, determining that the first UE is located in a first geographical area relative to the base station, determining that the second UE is located in a second geographical area relative to the base station, assigning the first UE to a first frequency band including a first range of frequencies and assigning the second UE to a second frequency band including a second range of frequencies, wherein the second range of frequencies is a subset of the first range of frequencies.

DETAILED DESCRIPTION

The exemplary embodiments may be further understood with reference to the following description and the appended drawings, wherein like elements are referred to with the same reference numerals. The exemplary embodiments describe an apparatus, system and method for allocating frequency bands to UEs within a coverage area of a base station operating as a massive MIMO base station. In the exemplary embodiments, the base station will be described as an evolved Node B (eNB) base station, which is generally known as being a base station associated with LTE networks. However, it will be understood by those skilled in the art that base stations operating in accordance with other network standards may also implement the exemplary embodiments in accordance with the functionalities and principles described herein, including further advancements in networking standards such as those commonly referred to as 5G systems and later.

Prior to describing the exemplary embodiments, several terms that will be used throughout this description will be described by example. A frequency spectrum for a radio access technology may be divided into different frequency bands. For example, LTE may be assigned a frequency spectrum. This frequency spectrum may be divided into a number N of discrete frequency bands. For example, in LTE, frequency band 1 may include the range of frequencies 1920-1980 MHz in the uplink (UL) and 2110-2170 MHz in the downlink (DL), frequency band 2 may include the range of frequencies 1850-1910 MHz in the UL and 1930-1990 MHz in the DL and frequency band 3 may include the range of frequencies 1710-1785 MHz in the UL and 1805-1880 MHz in the DL. LTE includes many more frequency bands, and these are provided only as an example.

Throughout this description, when it is referred to a UE being assigned a full frequency band, it means that the UE may use any of the frequencies within the assigned frequency band. For example, if a UE was assigned the full frequency band of LTE frequency band 1, the UE may use any of the frequencies 1920-1980 MHz in the UL. In contrast, when the UE is assigned a partial frequency band, the UE may only use a portion of the frequencies within the assigned frequency band. For example, if a UE was assigned the partial frequency band of LTE frequency band 1, the UE may use only a partial range of the frequencies 1920-1980 MHz in the UL, e.g., 1940-1960 MHz.

Figure 1:
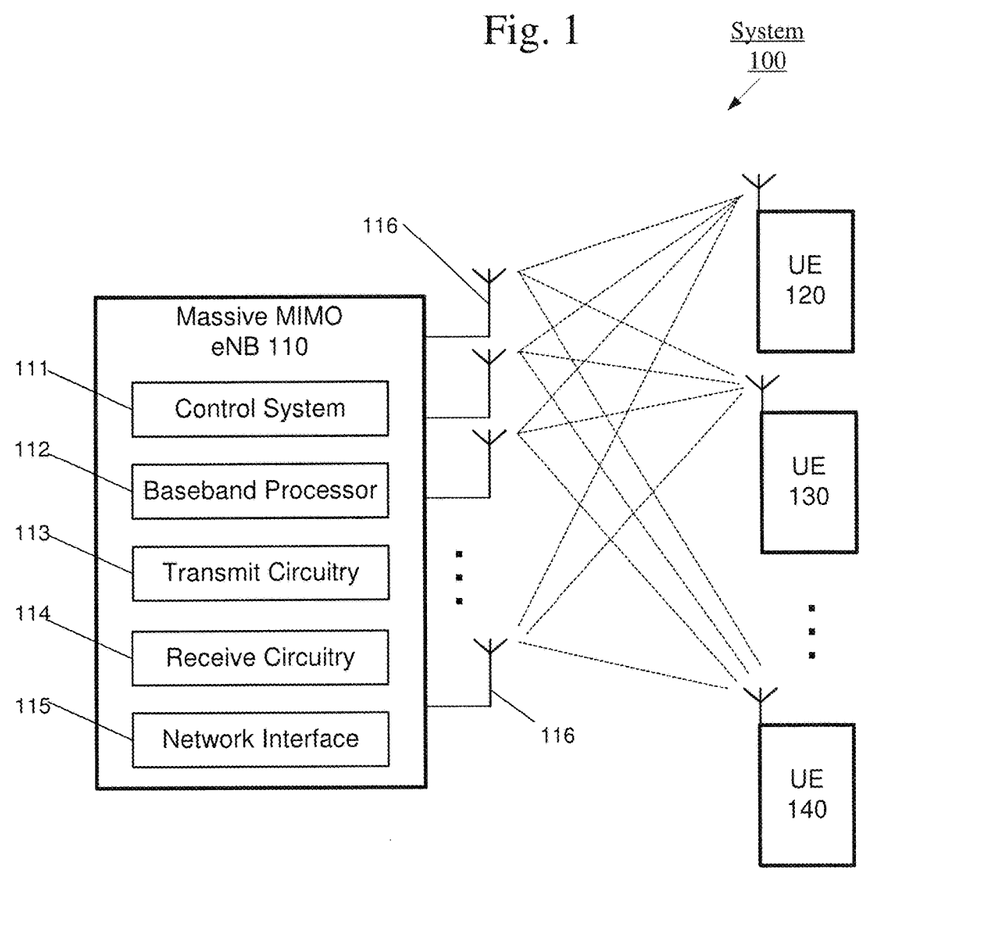
FIG. 1 shows an exemplary massive MIMO communication system according to various embodiments described herein.

FIG. 1 shows an exemplary massive MIMO communication system 100 according to various embodiments described herein. The exemplary system 100 may include a massive MIMO base station, such as an eNB 110, in communication with a plurality of mobile devices, such as UEs 120-140. Furthermore, the eNB 110 may include a control system 111, a baseband processor 112, transmit circuitry 113, receive circuitry 114, a network interface 115, and a plurality of multiple antennas 116. The receive circuitry 114 may receive radio frequency signals bearing information, such as location information, from one or more remote transmitters provided by UEs 120-140.

The baseband processor 112 of the eNB 110 may process the digitized received signal to extract the information or data bits conveyed in the received signal. This processing may include, for example, demodulation, decoding, and error correction operations. Accordingly, the baseband processor 112 may be implemented in one or more digital signal processors ("DSPs") or application-specific integrated circuits ("ASICs"). As described above, the information received from any one of the UEs 120-140 may be used to determine a location of the specific UE.

It should be noted that each of the components 111-115 of the eNB 110 may be implemented using a variety of electronic components including integrated circuits, ASICs, digital signal processors, etc. These components 111-115 may also execute software or firmware to perform the herein described functionalities. In addition, the eNB 110 may also include additional components that are not shown in FIG. 1.

Once the eNB 110 determines the current location of the UE, the eNB 110 may assign a frequency band for use by the UE. As described above, the frequency assigned to UE may include the full frequency band or a partial frequency band. The assignment by the eNB 110 of the full frequency band or partial frequency band may depend on the determined location of the UEs 120-140. The relative location of the UEs 120-140 may include, for example, being on the edge of the eNB 110 cell coverage, close to the eNB 110, etc. The assignment of the frequency band will be described in greater detail below. This assigned frequency band information may then be sent across a wireless network via the network interface 115 and may be transmitted back to UE.

In order to perform the transmission of the assignment information, the baseband processor 112 may receive digitized data, such as control information, from the network interface 115 under the control of control system 111, and encode the data for transmission. The encoded data is output to the transmit circuitry 113, where it is modulated by one or more carrier signals having a desired transmit frequency or frequencies. A power amplifier (not shown) may also be used to amplify the modulated carrier signals to a level appropriate for transmission, and deliver the modulated carrier signals to the antennas of the UEs 120-140.

Figure 2A:
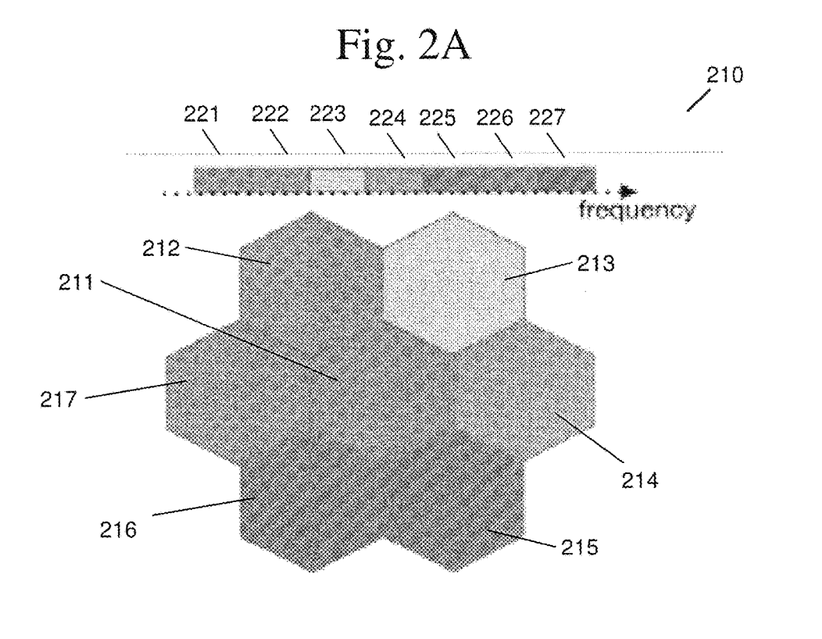
FIGS. 2A and 2B show spectrum frequency usage throughout an exemplary massive MIMO cell according to various embodiments described herein.
Figure 2B:
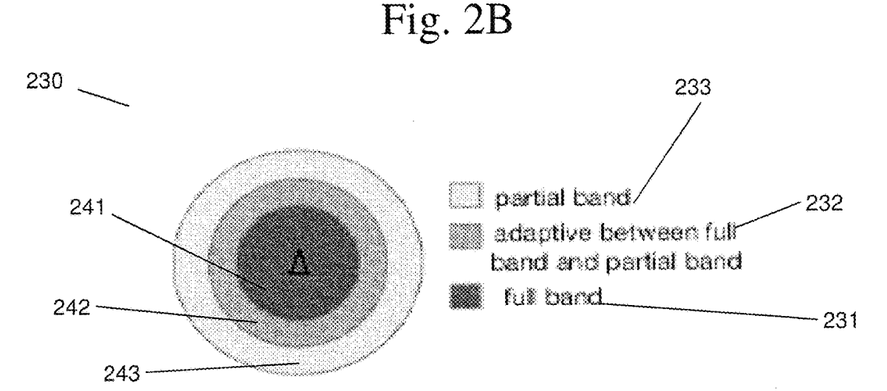

FIGS. 2A and 2B show frequency band usage throughout an exemplary massive MIMO cell according to an embodiment described herein. FIG. 2A illustrates a cell layout map 210 of an exemplary eNB (e.g., eNB 110) for managing the interference levels of a plurality of UEs in a massive MIMO network according to various embodiments described herein. As depicted in FIG. 2A, the frequency band assigned to the UE may be based on the cell in which the UE presently resides. More specifically, each of the cells in cell layout map 210 may represent a different frequency band. For example, in the cell layout map 210, cell 211 is assigned frequency band 221, cell 212 is assigned frequency band 222, cell 213 is assigned frequency band 223, cell 214 is assigned frequency band 224, cell 215 is assigned frequency band 225, cell 216 is assigned frequency band 226 and cell 217 is assigned frequency band 227. It may be noted that frequency band assignments for each of the eNBs may be predetermined, and thus do not require any communication between the eNBs.

FIG. 2B illustrates the eNB assignment 230 of frequency band based on the proximity of the UEs to the eNB according to various embodiments described herein. For example, FIG. 2B may represent any of the individual cells 211-217 having the corresponding frequency bands 221-227 as shown in FIG. 2A, e.g., the eNB assignment 230 may represent the cell 211 having frequency band assignment 221. As depicted in FIG. 2B, the eNB may adaptively adjust the frequency bands (e.g., full frequency band or partial frequency band) assigned to a UE as the location of the UE changes. Specifically, a UE traveling away from the eNB may transition from using the full frequency band 231 when in a region 241 closest to the eNB, to an adaptive usage 232 between full frequency band and partial frequency band when in a region 242, and finally to a partial frequency band 233 when on the edge of the cell in the region 243. During the adaptive usage 232, the eNB may alternate between full frequency band and partial frequency band depending on the current location information received from the UE, such as, but not limited to path loss and interference measurements. The aggregated regions 241-243 is the coverage area of the cell. Those skilled in the art will understand that the coverage area of the cell may be more irregular than the hexagonal shape shown in FIG. 2A and the circular shape shown in FIG. 2B.

According to the exemplary embodiments described herein, UEs that are in close proximity to the eNB (e.g., in region 241) may be assigned the full frequency band for use. For UEs that are further from the eNB, on the edge of the cell (e.g., in region 243), the eNB may assign only the partial frequency band. In order to minimize the potential for interference at the UE, the portion of the frequencies that correspond to a particular partial frequency band may be predetermined. Due to the fact that the eNB deploys a large number of antennas for massive MIMO communications with the UEs in the network, the eNB may compensate for the throughput loss of the UEs on the edge of the cell. It should be noted that the exact distances from the eNB that correspond to each of these regions 241-243 (e.g., full frequency band region 241, adaptive region 242, partial frequency band region 243) may depend on any number of factors. For example, an eNB that is located in close proximity to a large number of other eNBs, may have an edge region (partial frequency band region 243) that is larger than an eNB that is in proximity to a small number of other eNBs because there is a higher likelihood of interference between signals where there is a higher density of eNBs. Other factors such as physical obstructions may also be considered. In one exemplary embodiment, a frequency map may be created for each deployed eNB based on network planning factors. Thus, it is possible that each eNB may have a different frequency map (e.g., different regions 241-243).

Figure 3:
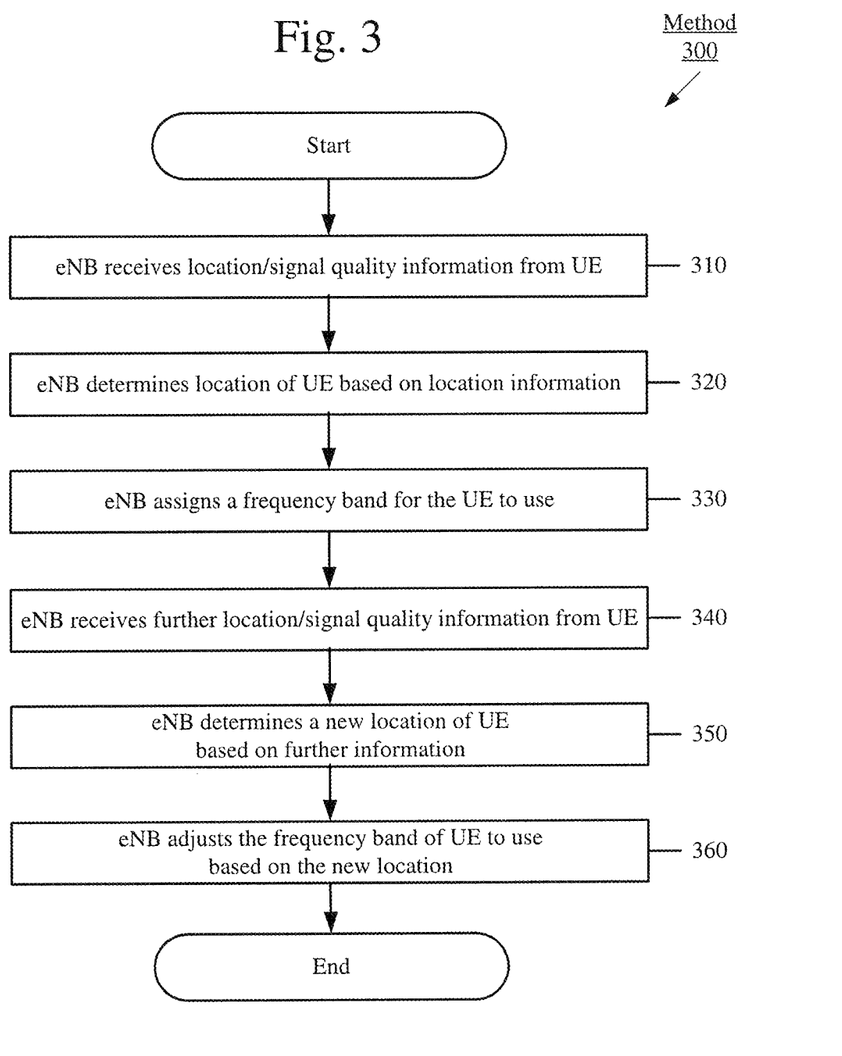
FIG. 3 shows an exemplary method for interference management by adapting a frequency spectrum usage of a UE within a massive MIMO communication system according to various embodiments described herein.

FIG. 3 shows an exemplary method 300 for interference management by adapting a frequency band usage of a UE within a massive MIMO communication system according to various embodiments described herein. It is noted that the entirety of method 300 may be performed by a base station, or eNB, capable of utilizing a plurality of antennas for communicating with at least one UE using massive MIMO operations. The exemplary method will be described with reference to the eNB 110 and UEs 120-140 of FIG. 1 and the cell regions 241-243 of FIG. 2B. However, as described above, the exemplary method may be implemented in other types of arrangements.

In 310, the eNB 110 may receive information from the UE (e.g., UE 120) indicating a location of the UE 120 and/or signal quality information for the UE 120. For instance, the received information may include location information such as Global Positioning Satellite ("GPS") information for the UE 120 or signal quality information such as a received signal strength indication ("RSSI") for the UE 120. One skilled in the art would understand that using GPS information is one exemplary method for determining a location of the UE, and the servicing eNB may use any number of alternative locating methods. For instance, other locating methods may include global navigation satellite systems ("GNSS"), visible WiFi access points, visible eNBs, etc. Furthermore, using the RSSI information is one exemplary method for determining signal quality, and the servicing eNB may use any number of alternative signal quality measuring methods. For instance, other measured signal quality metrics may include channel quality indicator ("CQI"), rank, signal to noise plus interference ratio ("SNIR"), etc.

In 320, the eNB 110 may determine a location of the UE 120 based on the received information. For instance, the eNB 110 may identify the relative location of the UE 120 as one of close to the eNB, midway within the cell coverage radius, or on the edge of the cell coverage. As noted above, UEs that are located in each of these locations may receive different treatment from eNB 110.

In 330, the eNB 110 may assign a frequency band for use by the UE 120 based on the determined location of the UE 120. For instance, any UEs that reside close to the eNB (e.g., in region 241) may be assigned the full frequency band for use, and any UEs that reside on the cell edge (e.g., in region 243) may be assigned a partial frequency band for use. In addition, UEs that are midway within the cell coverage radius (e.g., in region 242) may be provided with an adaptive assignment as the UE transitions either away or towards the eNB.

It should be noted that it is described in 320 that the eNB 110 determines the location of the UE 120 based on the location information. The signal quality information may also be used to determine the location. For example, the regions 241-243 may be defined in terms of the signal quality information rather than a geographic region. To provide a specific example, it may be considered that those UEs having an RSSI above a first threshold (e.g., a relatively high RSSI) may be considered to be in the region 241 that is relatively close to the eNB 110 and therefore are assigned the full frequency band. In contrast, those UEs having an RSSI below a second threshold (e.g., a relatively low RSSI) may be considered to be in the region 243 that is relatively far from the eNB 110 and therefore are assigned the partial frequency band. The adaptive region 242 may be considered to be the RSSI between these two thresholds. Again, it should be noted that this is only one example of using the signal quality information to be a proxy for a location and there may be other manners of making this location determination.

It should also be noted that it is described in 330 that the eNB 110 assigns the frequency band based on the identified region. However, the signal quality information may also be used to assign the frequency band. For example, the eNB 110 may use the location information to determine which region (e.g., regions 241-243) the eNB 110 is currently occupying. However, the eNB 110 may also use the signal quality information in making the assignment of the frequency band. For example, the eNB 110 may determine the UE is in region 241 using the location information. However, the signal quality information may indicate that there is a low signal quality between the UE 120 and the eNB 110 (e.g., a low RSSI). In such a situation, the eNB 110 may also consider the signal quality information when assigning the frequency band. For example, the combination of being in region 241 and a relatively low RSSI may lead the eNB 110 to assign the UE 120 to the adaptive band 232, rather than the full frequency band 231.

In 340, the eNB 110 may receive further information indicating a change in the location of the UE 120. As noted above, the information may include information related to location and/or signal quality information (e.g., GPS data and/or RSSI information) from the UE 120. Accordingly, in 350, the eNB 110 may determine a new location of the UE 120 based on the further location information.

In 360, the eNB 110 may adjust the frequency band assignment for use by the UE 120 based on the new location information. As described above, the assignment of the frequency band may be adaptive to allow for a change in a UE's assignment as the UE 120 travels within the coverage area of the eNB 110. Specifically, when the UE 120 travels to the cell edge (e.g., in region 243), the eNB 110 may adjust the frequency band assignment from the full frequency band to the partial frequency band.

The exemplary method 300 provides a manner of determining which region (e.g., regions 241-243) the UEs are currently occupying and which frequency band assignment (e.g., assignments 231-233) the eNB is to assign to the UEs. If the UE 120 is assigned to the adaptive usage 232, the eNB 110 may alternate between full frequency band and partial frequency band. For example, the UE 120 may remain within the same region 242, but in some instances be assigned the full frequency band and in other instances be assigned the partial frequency band. The eNB 110 may determine this adaptive usage based on factors that are directly related to the UE 120 and/or factors that are not directly related to the UE 120. In one example, the eNB 110 may make direct measurements from signals received from the UE 120, such as, but not limited to path loss and interference measurements to determine whether to assign the full frequency band or the partial frequency band to the UE 120 (e.g., high path loss or interference indicates the eNB 110 should assign the partial frequency band to the UE 120). These measurements relate directly to the operation of the UE 120. In another example, the eNB 110 may make the determination based on information such as, but not limited to, cell loading or UE clustering information based on beam foaming required to be used by the cell (e.g., a high cell load or highly clustered UEs indicates the eNB 110 should assign the partial frequency band to the UE 120). These measurements do not relate directly to the operation of the UE 120, but rather relate to the operation or conditions within the cell.

By utilizing the frequency management embodiment described above in the method 300 of FIG. 3, the eNB 110 may continue to manage the frequency band usage of the UE 120, as well as any other UEs in the cell (e.g., UEs 130 and 140), while minimizing the interference levels of the UEs.

Figure 4:
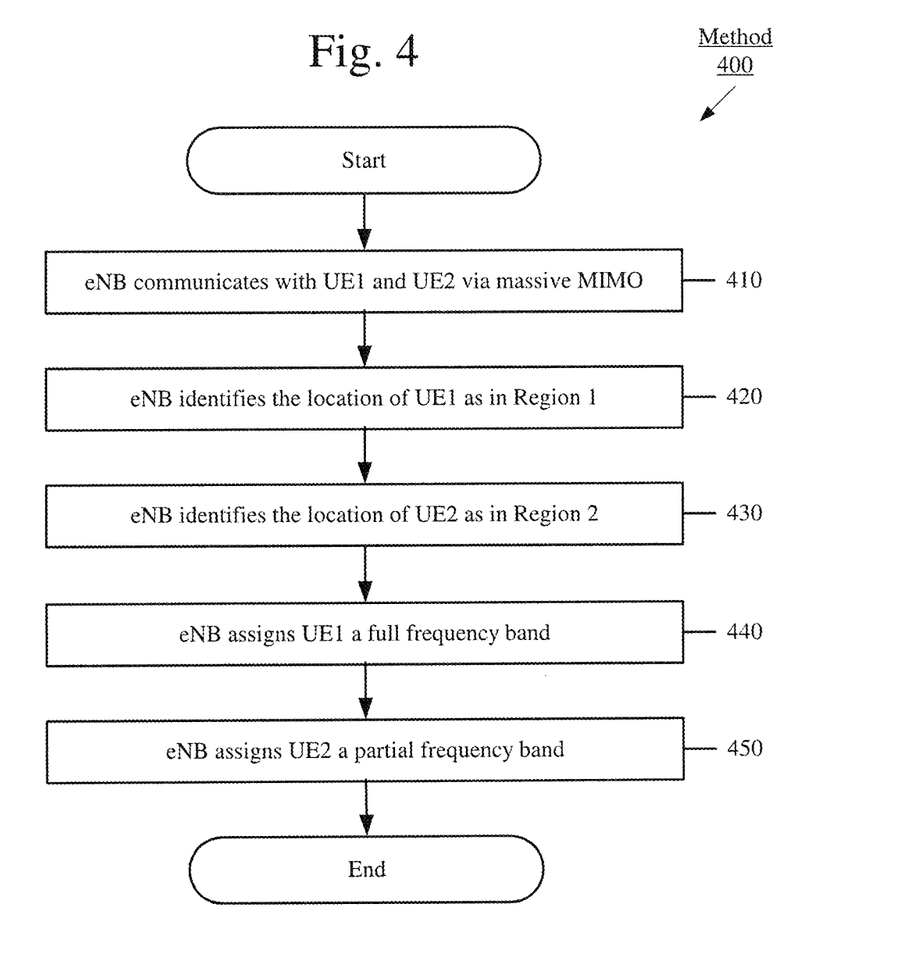
FIG. 4 shows an exemplary method for managing interference levels for a plurality of UEs within a massive MIMO communication system according to various embodiments described herein.

FIG. 4 shows an exemplary method 400 for managing interference levels for a plurality of UEs within a massive MIMO communication system according to various embodiments described herein. Again, this exemplary method 400 will be described with reference to the eNB 110 and UEs 120-140 of FIG. 1 and the cell regions 241-243 of FIG. 2B.

In 410, the exemplary eNB (e.g., eNB 110), or base station, may communicate with a first UE ("UE1") (e.g., UE 130) and a second UE ("UE2") (e.g., UE 140) via massive MIMO operations. According to one embodiment of the method 400, the UE1 130 may reside close to the eNB 110 and the UE2 140 may reside on the edge of the cell.

In 420, the eNB 110 may determine that the UE1 130 is located in a first geographical area relative to the base station (e.g., region 241). As noted above, the eNB 110 may utilize any number of locating techniques and signal quality measuring techniques, such as analysis of GPS data and/or RSSI data of the UE1 130.

In 430, the eNB 110 may determine that the UE2 140 is located in a second geographical area relative to the base station (e.g., region 243), wherein the second geographical area is further from the base station than the first geographical area. More specifically, the eNB 110 may identify the UE2 140 as being located at the edge of the cell coverage.

In 440, the eNB 110 may assign the full frequency band to the UE1 130. Since the UE1 130 is in close proximity to the eNB 110, the level of interference received at the UE1 130 may be minimal. Accordingly, the UE1 130 may be allocated the full frequency band 231 from the eNB 110 because the UE1 130 is unlikely to receive interference from signals from other eNBs. Those skilled in the art will understand that the use of the full frequency band 231 allows the UE to support a higher throughput.

In 450, the eNB 110 may assign the partial frequency band 233 to the UE2 140. Since the UE2 140 is further from the eNB 110, the potential for interference from neighboring cells may be high. Accordingly, the UE2 140 may be allocated the partial frequency band by the eNB 110. This partial frequency band may be predetermined by the eNB 110 as to minimize the level of interference received at the UE2 140 as it resides on the cell edge (e.g., region 243). For example, the range of frequencies in the partial frequency band may be selected as mid-range frequencies within the frequency band because these are less likely to interfere with adjacent frequency bands. For example, in LTE frequency band 1 having the range of 1920-1980 MHz in the uplink (UL), the partial frequency band may be assigned as 1940-1960 MHz. In contrast to using the full frequency band, this usage of the partial frequency band results in a lower throughput. However, the use of the massive MIMO scheme may alleviate the throughput disadvantages caused by the partial frequency band usage.

Figure 5:
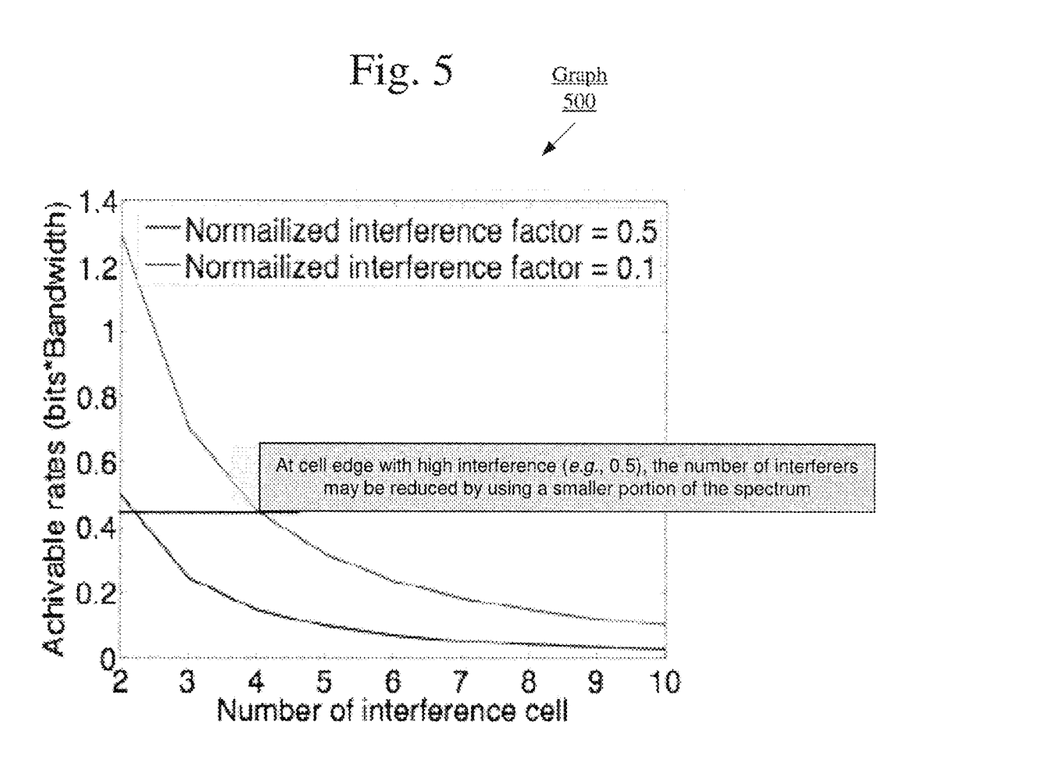
FIG. 5 shows an exemplary graph illustrating interference levels within a massive MIMO network according to various embodiments described herein.

FIG. 5 shows an exemplary graph illustrating interference levels within a massive MIMO network according to various embodiments described herein. Specifically, the graph 500 shows the asymptotic results of interference measurements exhibiting high signal to noise ratios ("SNR"). As depicted in the graph 500, the interference level of a UE increases as the UE moves away from the servicing eNB and toward the edge of the cell. With the increase in the interference level, the number of interferers can be reduced in order to maintain the same throughput. Accordingly, a smaller bandwidth may be used at the UE by the eNB assigning the partial frequency band to any UEs at the edge of the cell.

It may be noted that the exemplary embodiments are described with reference to the LTE-Advanced massive MIMO communication system. However, those skilled in the art will understand that the exemplary embodiments may be applied to managing the interference within any wireless communication schemes including those having different characteristics from the LTE-Advanced scheme.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

The invention claimed is:

1. A method, comprising:
   at a base station:
   determining a location of a user equipment ("UE"), wherein the base station communicates with the UE via massive multiple-input and multiple-output ("MIMO") operations, wherein the base station includes a coverage area having a plurality of regions;
   assigning a full frequency band to the UE based on a UE location within a full frequency band region of the plurality of regions, wherein the UE communicates with the base station on an operating frequency within the full frequency band while the UE is located within the full frequency band region;
   identifying a new location of the UE within a partial frequency band region of the plurality of regions; and
   adjusting the frequency band assigned to UE to a partial frequency band based on the new UE location within the partial frequency band region, wherein the UE communicates with the base station on an operating frequency within the partial frequency band while the UE is located within the partial frequency band region, wherein the partial frequency band is a subset of the full frequency band.

2. The method of claim 1, wherein adjusting the frequency band narrows a range of frequencies to be used by the UE.

3. The method of claim 1, wherein the UE location is determined based on one of location information or signal quality information received from the UE.

4. The method of claim 3, wherein the location information includes one of Global Positioning Satellite (GPS) information, global navigation satellite systems (GNSS) information, visible WiFi access points information, or visible evolved Node B information.

5. The method of claim 3, wherein the signal quality information includes one of a received signal strength information (RSSI), a channel quality indicator ("CQI"), a rank, or a signal to noise plus interference ratio ("SNIR").

6. The method of claim 1, wherein the regions include an adaptive usage region where the UE is assigned one of the full frequency band or the partial frequency band.

7. The method of claim 6, wherein, when the UE location is in the adaptive usage region, the UE is assigned the one of the full frequency band or the partial frequency band based on one of a first characteristic of a signal received from the UE or a second characteristic of a cell of the base station.

8. The method of claim 7, wherein the first characteristic of the signal received from the UE is one of a path loss or interference of the signal.

9. The method of claim 7, wherein the second characteristic of the cell of the base station is a cell loading or a cell clustering.

10. A base station device, comprising:
a plurality of antennas configured to perform massive multiple-input and multiple-output ("MIMO") operations;
receive circuitry configured to receive signals from a user equipment (UE) within a coverage area of the base station, wherein the base station includes a coverage area having a plurality of regions;
a baseband processor configured to determine a location of the UE within one of the plurality of regions within the coverage area and assign a full frequency band to the UE based on a UE location within a full frequency band region of the plurality of regions, wherein the UE communicates with the base station on an operating frequency within the full frequency band while the UE is located within the full frequency band region, identify a new location of the UE within a partial frequency band region of the plurality of regions, and adjust the frequency band assigned to the UE to a partial frequency band based on the new UE location within the partial frequency band region, wherein the UE communicates with the base station on an operating frequency within the partial frequency band while the UE is located within the partial frequency band region, wherein the partial frequency band is a subset of the full frequency band; and
transmit circuitry to transmit the frequency band assignments to the UE.

11. The base station of claim 10, wherein the regions include an adaptive usage region where the UE is assigned one of the full frequency band or the partial frequency band.

12. The base station of claim 11, wherein, when the location is in the adaptive usage region, the UE is assigned the one of the full frequency band or the partial frequency band based on one of a first characteristic of a signal received from the UE or a second characteristic of a cell of the base station.

13. The base station of claim 11, wherein the full frequency band region is an area closer to the base station than the partial frequency band region and the adaptive usage region is intermediately located between the full frequency band region and the partial frequency band region.

14. The base station of claim 11, wherein the partial frequency band is a mid-range of frequencies within the full frequency band.

15. The base station of claim 10, wherein the full frequency band does not overlap with operating frequency bands of any neighboring base stations.

16. The base station of claim 10, wherein the full frequency band includes an uplink (UL) operating frequency band and a downlink (DL) operating frequency band, wherein there are no overlapping frequencies between the UL operating frequency band and the DL operating frequency band.

17. An integrated circuit at a base station, comprising:
circuitry to determine a location of a user equipment ("UE"), wherein the base station communicates with the UE via massive multiple-input and multiple-output ("MIMO") operations, wherein the base station includes a coverage area having a plurality of regions;
circuitry to assign a full frequency band to the UE based on a UE location within a full frequency band region of the plurality of regions, wherein the UE communicates with the base station on an operating frequency within the full frequency band while the UE is located within the full frequency band region;
circuitry to identify a new location of the UE within a partial frequency band region of the plurality of regions; and
circuitry to adjust the frequency band assigned to the UE to a partial frequency band based on the new UE location within the partial frequency band region, wherein the UE communicates with the base station on an operating frequency within the partial frequency band while the UE is located within the partial frequency band region, wherein the partial frequency band is a subset of the full frequency band.

18. The integrated circuit of claim 17, wherein:
the regions include an adaptive usage region where the UE is assigned one of the full frequency band or the partial frequency band; and
when the UE location is in the adaptive usage region, the UE is assigned the one of the full frequency band or the partial frequency band based on one of a first characteristic of a signal received from the UE or a second characteristic of a cell of the base station.

* * * * *